April 24, 1962    E. BARTHOLOMÉ ET AL    3,031,286
FLAMELESS REACTION OF SULFUR-CONTAINING
GASEOUS HYDROCARBONS TO FORM CARBON
MONOXIDE AND HYDROGEN
Filed Aug. 31, 1959
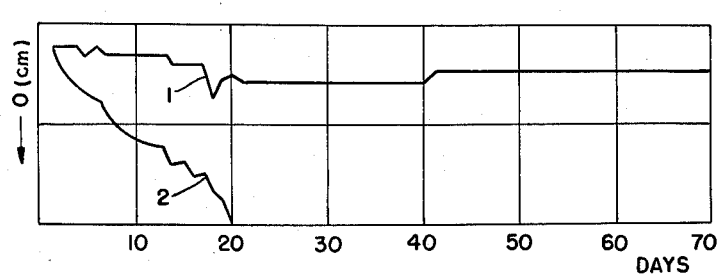
INVENTORS:
ERNST BARTHOLOMÉ
KARL-HEINZ GRUENDLER
WALTER TELTSCHIK
BY
ATT'YS

United States Patent Office 3,031,286
Patented Apr. 24, 1962

3,031,286
FLAMELESS REACTION OF SULFUR-CONTAINING GASEOUS HYDROCARBONS TO FORM CARBON MONOXIDE AND HYDROGEN
Ernst Bartholomé, Heidelberg, Karl-Heinz Gruendler, Ludwigshafen (Rhine), and Walter Teltschik, Ludwigshafen (Rhine)-Gartenstadt, Germany, assignors to Badische Anilin-Soda-Fabrik Aktiengesellschaft, Ludwigshafen (Rhine), Germany
Filed Aug. 31, 1959, Ser. No. 836,970
Claims priority, application Germany Sept. 3, 1958
5 Claims. (Cl. 48—196)

This invention relates to a process for the flameless reaction of gaseous hydrocarbons or gases which contain such hydrocarbons, to form carbon monoxide and hydrogen. In particular the invention relates to a process for the flameless reaction of sulfur-containing gases of the said kind.

According to prior methods gaseous hydrocarbons, especially methane, or gases which contain such hydrocarbons are reacted with an amount of oxygen insufficient for complete combustion, possibly with admixture of steam and/or carbon dioxide, at rigidly-arranged catalysts in two stages to form carbon monoxide and hydrogen without the formation of a flame. In this known procedure, a part of the hydrocarbons is burned over an oxidation catalyst in the first stage, and in the second stage the remainder of the hydrocarbons is further reacted with steam and/or carbon dioxide in an endothermic reaction, also over a catalyst, as for example a nickel catalyst applied to a refractory carrier, to form carbon monoxide and hydrogen.

In principle it is possible to carry out both stages of the process in a coherent zone in the presence of nickel catalysts. However, the use of nickel catalysts in the first stage has the disadvantage that the catalyst is used up relatively quickly at the local points of maximum temperature and a migration of the same through the zone of the nickel catalyst is thereby initiated. By this local deactivation, the maximum temperature migrates out from the first catalyst zone. The catalyst must therefore be replaced after use for a comparatively short period.

It is also known to use in the first process stage a finely divided platinum catalyst which is applied to refractory inert granular material. Magnesite is used as carrier material in this known method. Catalysts of this type have the property of stabilizing the temperature peak of the exothermic phase of the reaction in general at temperatures between 900° and 1100° C. in the catalyst chamber. A prerequisite for this, however, is that the hydrocarbons or gases containing hydrocarbons which are used do not contain any appreciable amount of sulfur compounds, for example less than 30 mg. of sulfur per normal cubic meter. For a particularly successful operation of the process there is even required a sulfur content which lies below 5 mg. of sulfur per normal cubic meter of the gas to be reacted. If the gas to be reacted contains larger amounts of sulfur, the position of the reaction peak no longer remains constant. In this case, after the initiation of the oxidation, the maximum temperature of the reaction begins to migrate from its initial position and in the course of a few days has passed out from the oxidation zone. Therefore, there have hitherto been encountered considerable difficulties when cracking hydrocarbons or gases containing hydrocarbons, having a high sulfur content with the known catalysts in a two-stage flameless process.

The object of this invention is the flameless reaction of hydrocarbons, or gases containing hydrocarbons, with a high sulfur content in a continuous method in a two-stage process to form carbon monoxide and hydrogen, especially the flameless reaction of hydrocarbons or gases containing hydrocarbons of which the sulfur content is more than 30 mg. per normal cubic meter. A further object of the process according to this invention is the flameless cracking of hydrocarbons or gases containing hydrocarbons with a high sulfur content to form a gas which mainly contains carbon monoxide and hydrogen and in which there occurs less than 0.5% by volume of unreacted hydrocarbons, for example methane.

We have found that sulfur-containing hydrocarbons, or gases containing the same, can also be reacted in an advantageous way in a two-stage flameless process to form carbon monoxide and hydrogen by using as catalyst in the first stage a platinum metal which has been applied to a carrier of alpha-$Al_2O_3$. In the process according to our invention the initial materials are partially burned in the first stage with an amount of oxygen insufficient for complete combustion, possibly with admixture of steam and/or carbon dioxide, at a platinum metal catalyst applied to an alpha-aluminum oxide carrier and in the second stage the remainder of the hydrocarbons is reacted with steam and carbon dioxide in an endothermic reaction. Steam and/or carbon dioxide may be admixed to the initial materials prior to their introduction into the first stage. The endothermic reaction in the second stage may however also be carried out without adding steam and/or carbon dioxide to the first stage while relying exclusively on the steam and carbon dioxide formed by partial combustion in the first stage.

Suitable initial materials are sulfur-containing gaseous hydrocarbons, especially those containing methane, as for example natural gas, coke oven gas and other gases containing methane. According to this invention methane-containing gases are reacted which preferably contain 15 to 45% of methane and which have a relatively high sulfur content, for example 30 to 300 mg. of sulfur per normal cubic meter, preferably 30 to 150 mg. of sulfur per normal cubic meter. Sulfur-containing gaseous hydrocarbons, as for example natural gas, which contain up to 95% of hydrocarbons, especially methane, and which contain equally large amounts of sulfur, may also be reacted with advantage.

Among the platinum metals, platinum itself is especially suitable. In general it is sufficient to use catalysts which contain 0.003 to 0.15% by weight, preferably 0.01 to 0.1% by weight, of a platinum metal, especially platinum. The production of the catalysts may be carried out by first converting into alpha-$Al_2O_3$ (corundum) any alumina by preliminary heating at temperatures of about 1000° C. or more, for example at 1000° to 1400° C., and then impregnating the pretreated carrier material with a solution of a salt of a platinum metal, preferably platinum, for example with a solution of platinum chloride or a solution of platinum hydrochloric acid $H_2PtCl_6$ at room temperature. The platinum metal salt applied to the carrier is then reduced to the metal by heating. It is, however, also possible to impregnate the carrier material first with the platinum metal salt solution and then to convert the carrier material by calcination into the desired alpha-modification. The crystallographic conversion and the reduction of the platinum metal salt may also take place in the cracking reactor itself, possibly during the reaction. The said catalysts may be rigidly arranged in the oxidation chamber or may be agitated in the form of a fluidized layer.

The gases to be reacted may be introduced at 500° to 600° C., and in the first catalyst zone, i.e. in the layer of platinum metal catalyst, reach temperatures of 800° to 1300° C., preferably 900° to 1100° C. In the second reaction zone, a nickel catalyst is used which preferably contains 1 to 40% of nickel applied to a refractory carrier substance. Examples of refractory substances are aluminum oxide and mixtures of metal oxides, such as magnesium oxide, zirconium oxide, calcium oxide and other alkaline earth oxides or spinels. Silicon dioxide may also be used as a carrier in the second reaction zone. A nickel catalyst which contains 2 to 15% of nickel on magnesite as carrier substance is especially suitable. The two catalyst layers may be arranged in different mutual relationship as regards height. The layer height ratio of the platinum catalyst layer to the nickel catalyst layer can be varied. It is advantageous to use platinum metal catalyst layers of 10 to 40 centimeters and nickel catalyst layers of the same thickness. It is also possible however to use nickel catalyst layers down to 2 centimeters in thickness.

By the new process it is possible also to crack sulfur-containing hydrocarbons and gases containing the same in a flameless reaction in continuous operation to form carbon monoxide and hydrogen without the catalysts exhibiting poisoning phenomena after a short time. The advantage is that no attention need be paid to the purity of the gases being treated. In particular it is possible according to this invention to react hydrocarbons and gases containing the same which have a sulfur content higher than 30 mg. of sulfur per normal cubic meter of the gas to be reacted.

The following example will further illustrate this invention but the invention is not restricted to this example. Unless otherwise specified, the parts and percentages in the example are by volume.

*Example*

A coke oven gas is reacted with a mixture of oxygen, air and steam in the following proportions:

1 part of coke oven gas,
0.0885 part of oxygen,
0.404 part of air and
0.315 part of steam.

The steam is absorbed by saturation of the initial gas at 67° C. The initial gas is preheated to 600° C. by heat exchange. The coke oven gas, of which 2.0 normal cubic meters per hour are reacted, has the following composition:

|  | Percent |
|---|---|
| $O_2$ | 0.5 |
| $CO_2$ | 1.8 |
| $CO$ | 6.2 |
| $H_2$ | 52.3 |
| $CH_4$ | 24.8 |
| $C_2H_4$ | 2.5 |
| $N_2$ | 11.9 |

100 mg. of sulfur are contained in each normal cubic meter of the coke oven gas. The oxidation catalyst used for the first stage is 0.04% by weight of platinum on a carrier of alpha-$Al_2O_3$ (corundum). The platinum catalyst is prepared by impregnating the carrier while cold with an aqueous solution of platinum chloride and then decomposing the platinum chloride. The carrier used has a granulation of 8 to 10 mm. The catalysts are arranged in the reactor in the direction of flow of the gas as follows: Following a preliminary layer of magnesite in a thickness of 10 cm. there is the layer of platinum catalyst 20 cm. thick. Finally there is a layer 45 cm. thick of a nickel catalyst on magnesite as carrier.

The local position of the maximum temperature of the reaction and the change in the same during a prolonged reaction period may be seen from the accompanying drawing which is a graph in which the time in days is plotted against the distance in cms. of the maximum temperature from the point of entry of the gas into the catalyst zone.

The line 1 gives the position of the maximum temperature in the platinum catalyst zone when using a platinum catalyst on corundum, and the line 2 shows, for purposes of comparison, the position of the maximum temperature when using a platinum catalyst on a magnesite carrier.

The reaction zone remains stable in the platinum catalyst only when using a corundum carrier. The position of the reaction zone can be followed by measuring the peak temperature of the reaction. After a period of 96 days, it is still not possible to detect any decline in the activity of the catalyst. The cracked gases leave the cracking reactor at a temperature of 950° C. There are obtained 3.7 normal cubic meters per hour of a cracked gas of the following average composition:

|  | Percent |
|---|---|
| $CO_2$ | 3.4 |
| $CO$ | 16.7 |
| $H_2$ | 56.0 |
| $CH_4$ | 0.2 |
| $N_2$ | 23.7 |

If, under otherwise the same conditions (same mixing ratio of the initial gases, same preheating and saturation temperatures), the oxidation catalyst of platinum on alpha-$Al_2O_3$ is replaced by a platinum catalyst which has been applied to a magnesite carrier, it is observed, as may be seen from the drawing, that in the course of a few days the maximum temperature of the reaction migrates from the platinum catalyst zone toward the nickel catalyst zone.

We claim:
1. In a method of producing carbon monoxide and hydrogen in two stages by a flameless reaction of sulfur-containing gaseous hydrocarbons with an amount of oxygen which is insufficient for complete combustion of the gaseous hydrocarbons in the first stage and by reacting the remaining hydrocarbons endothermically with steam and carbon dioxide in the second stage, the improvement which comprises using in the first stage as catalyst a platinum metal applied to a carrier of alpha-$Al_2O_3$.

2. The method as claimed in claim 1 wherein there is used as initial material a gaseous hydrocarbon of which the sulfur content is more than 30 mg. per normal cubic meter of gas.

3. The method as claimed in claim 2 wherein in the first stage a catalyst is used which contains from 0.003 up to 0.15% by weight of platinum applied to a carrier of alpha-$Al_2O_3$.

4. In a method of producing carbon monoxide and hydrogen in two stages by a flameless reaction of sulfur-containing gaseous hydrocarbons with an amount of oxygen which is insufficient for complete combustion of the gaseous hydrocarbons in the first stage and by reacting the remaining hydrocarbons endothermically with steam and carbon dioxide in the second stage in the presence of a nickel catalyst which contains from 1 to 40% by weight of nickel applied to a refractory carrier, the improvement which comprises using in the first stage as catalyst a platinum metal applied to a carrier of alpha-$Al_2O_3$.

5. A method as claimed in claim 1, wherein the alpha-$Al_2O_3$ carrier is an alumina which has been heated to a temperature in the range of 1,000–1,400° C. to give the alpha-form.

References Cited in the file of this patent

UNITED STATES PATENTS

| 2,482,866 | Phinney | Sept. 27, 1949 |
| 2,655,442 | Mayland | Oct. 13, 1953 |
| 2,854,404 | Prater et al. | Sept. 30, 1958 |